Figure 1:
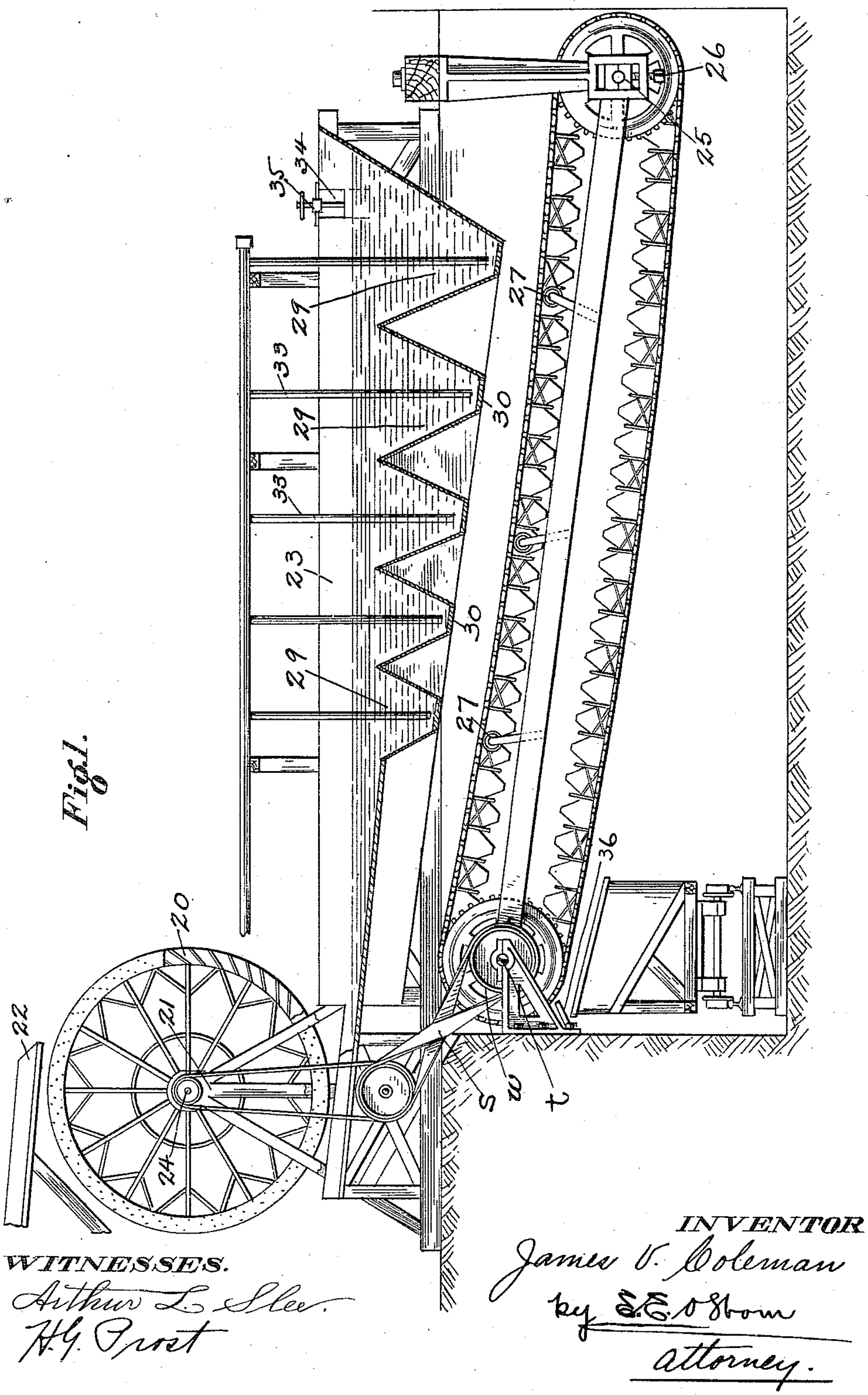

J. V. COLEMAN.

APPARATUS FOR SEPARATING MINERAL BEARING MATTER FROM STREAMS OF WATER.

APPLICATION FILED APR. 4, 1910.

995,526. Patented June 20, 1911

3 SHEETS—SHEET 1.

WITNESSES.

Arthur L. Slee.

H. G. Prost

INVENTOR

James V. Coleman by S. E. Osborn attorney.

THE NORRIS PETERS CO., WASHINGTON, D. C.

J. V. COLEMAN.

APPARATUS FOR SEPARATING MINERAL BEARING MATTER FROM STREAMS OF WATER.

APPLICATION FILED APR. 4, 1910.

995,526. Patented June 20, 1911.

3 SHEETS—SHEET 2.

WITNESSES.

Arthur L. Slee

H. G. Prost

INVENTOR

James V. Coleman by E. E. Osborn attorney.

THE NORRIS PETERS CO., WASHINGTON, D. C.

J. V. COLEMAN.

APPARATUS FOR SEPARATING MINERAL BEARING MATTER FROM STREAMS OF WATER.

APPLICATION FILED APR. 4, 1910.

995,526. Patented June 20, 1911.

3 SHEETS—SHEET 3.

WITNESSES.

H. G. Prost.

Arthur L. Slee.

INVENTOR

James V. Coleman by E. E. Osborn

ATTORNEY

THE NORRIS PETERS CO., WASHINGTON, D. C.

UNITED STATES PATENT OFFICE.

JAMES V. COLEMAN, OF SAN FRANCISCO, CALIFORNIA.

APPARATUS FOR SEPARATING MINERAL-BEARING MATTER FROM STREAMS OF WATER.

995,526. Specification of Letters Patent. Patented June 20, 1911.

Application filed April 4, 1910. Serial No. 553,407.

*To all whom it may concern:*

Be it known that I, JAMES V. COLEMAN, a citizen of the United States, and a resident of the city and county of San Francisco, State of California, have invented new and useful Improvements in Apparatus for Separating Mineral-Bearing Matter from Streams of Water, of which the following is a specification.

This invention is an endless movable sluice for use principally in separating and recovering metallic particles from mineral bearing matter which is carried in suspension in a stream or body of water in motion, such for example as the "tailings" from ore mills and other machines and appliances in an ore mining and milling plant. This apparatus or contrivance is herein termed, for convenience of description, an "endless movable sluice", for the reason that it resembles and partakes of the character of a mining sluice in being trough-like in shape and having its bottom divided into separate compartments by ridges or barriers extending transversely across the bottom from side to side, like the well known riffles in the bottom of a mining sluice. It differs from such a sluice, however, first in having its bottom composed of or provided with a succession of cavities or "pockets" separated by transverse ridges and having sloping sides that give the pocket a trough like shape; and secondly in having the form of an endless belt so that when placed on carrying wheels or pulleys it will travel in an endless round as the carriers are revolved. This endless traveling quality of the sluice of my invention is secured by constructing the bottom and sides of canvas or other material sufficiently pliable or flexible to permit the bottom and the sides to crimp, or fold, or otherwise contract to smaller dimensions when the direction of the travel or progressive movement of the sluice changes or deviates from a straight path, and especially where it passes over and returns around the end pulleys or wheels; and further by forming the bottom of the sluice of a number of pockets or cavities separated by ridges or standing barriers, arranged between and around a set of carrying wheels or pulleys to which movement is imparted by applying power to one or both of the carrying pulleys.

In adapting the apparatus for ordinary work of separating the solid material from the flowing stream or body of water the endless sluice is operated by a continuous progressive movement without a vibrating motion. Material of such specific gravity that it will separate effectively from the water in which it is in suspension can be worked to advantage without the vibrating motion.

In proceeding to describe more fully the construction and arrangement of the parts and mechanism in which I have embodied the said invention, the accompanying drawings are referred to by figures and letters, the same illustrating what I consider is the best practical form and embodiment of my invention.

Figure 2:
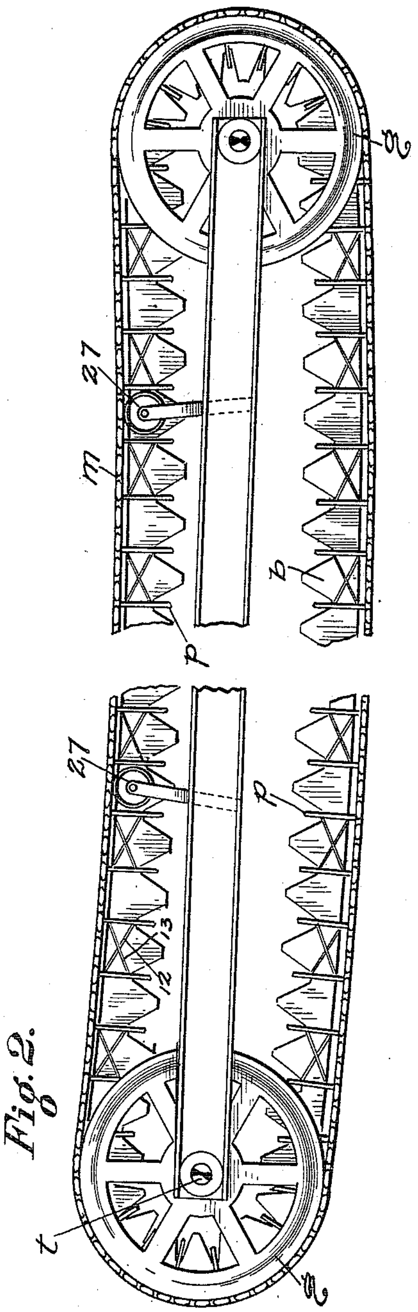
Figure 3:
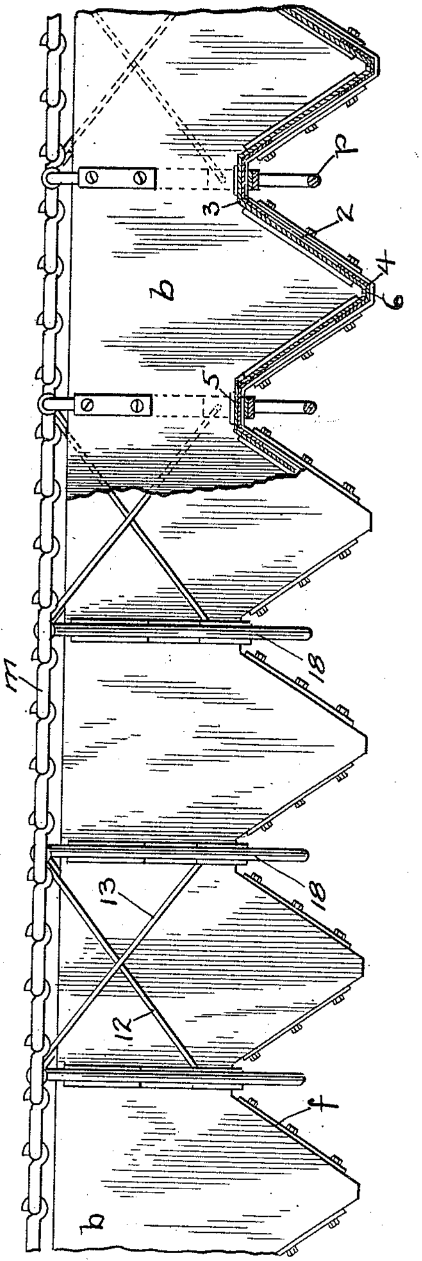
Figure 4:
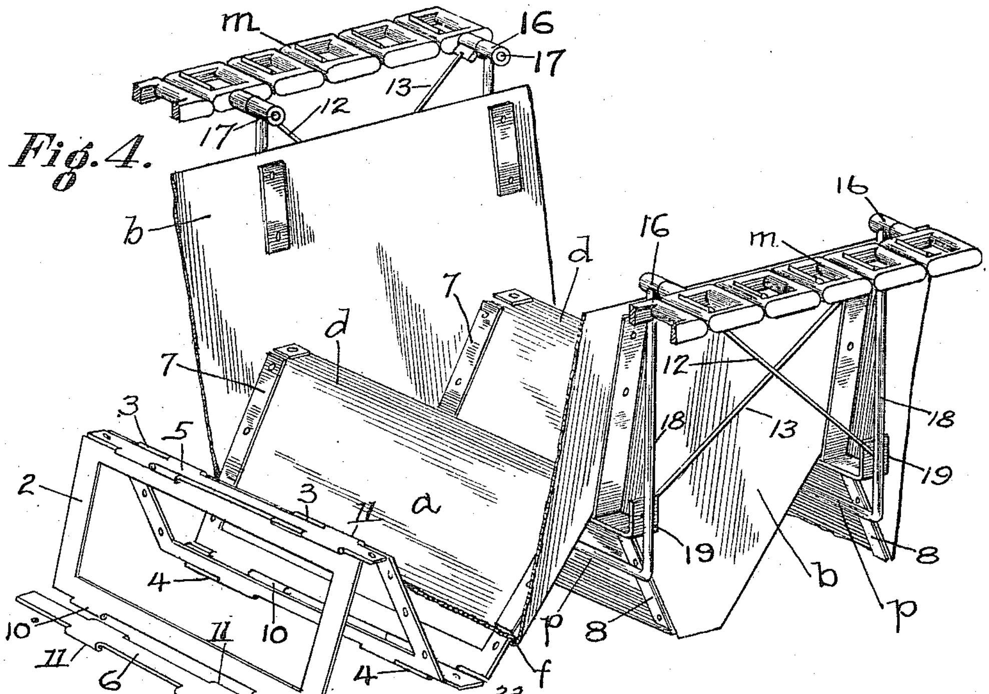
Figure 5:
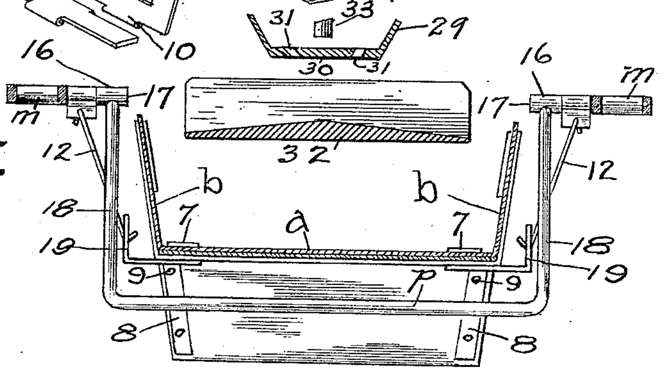
Figure 6:
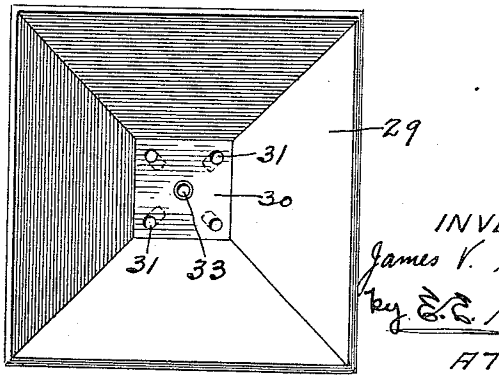

Figure 1 of the drawings represents in general side elevation an endless traveling sluice of my invention adapted for concentrating and separating the valuable mineral matter from a moving stream or body of water holding the same in suspension, the apparatus being of such construction that the power to operate the sluice is taken from the moving stream itself the feeding trough being shown in section. Fig. 2 is a side elevation on an enlarged scale of the endless traveling sluice of my invention, illustrating the manner of supporting and carrying the sluice between two endless movable belts running on pulleys or carriers. Fig. 3 is a side elevation on an enlarged scale of a portion of the sluice, shown partly in longitudinal section. Fig. 4 is a detail view in perspective of several compartments of the sluice, showing the fabric removed from a part of the skeleton frames. Fig. 5 is a transverse sectional-view of the sluice. Fig. 6 is a top-view of one of the compartments of the feeding-on trough.

These drawings illustrate an endless traveling sluice for handling or operating on the "tailings" from concentrators and other gold saving and separating apparatus in mining plants.

As a substitute for a stationary sluice the invention will be found of advantage not only in performing the work of a stationary sluice of much greater length, but also in obtaining a more effective as well as a more rapid separation and concentration of the sediment and other matter from the running stream.

In the separating apparatus represented in Fig. 1 of the drawings the dimensions of the endless sluice are about twenty feet between the end pulleys, which have a diameter of thirty inches; the width of the sluice at the top is twelve inches, and the depth of the pockets four inches. The distance between the top edge of the standing sides and the top ridges between the pockets is about six inches. These dimensions will vary according to the required capacity of the sluice, to the weight of the load, and to other conditions as before mentioned. They will be seen to govern also the quality of the pliable material from which the endless sluice is formed. In the foregoing description the dimensions and the proportions given are not to be taken as confining the invention either as to the size or the proportion of the parts above mentioned.

A novel feature in this endless traveling sluice of my invention is the peculiar construction of the pockets, the same being so formed that they will open and remain distended while the sluice is traveling in a straight line or path, but when the sluice changes its direction of travel from a straight path to a curved one, as in passing over and around the carrying wheels at the ends in making the circuit, the bottom of the sluice will fold or contract sufficiently to allow the pockets to pass around the axis without disturbing their general form. At those periods in its travel where it moves around the axis of the carrying wheels the bottom of the sluice will fold or contract to smaller dimensions, and the sides will fold also, being made for that purpose of canvas or other material of sufficient pliability.

Canvas coated with rubber or treated with some other substance to render the sides and bottom impervious to water, and so hold the water as well as the separated solid particles without leaking, is a good material from which to make the bottom and the sides of this sluice.

As illustrated in Figs. 3, 4 and 5 the bottom *a* is a succession of transversely extending folds formed by folding the same at regular intervals apart alternately downward and upward in angular folds, so that the inner angles form angular cavities or pockets, and the outer angles separating them constitute ridges or barriers *d* between the pockets from one side wall of the sluice to the other. The sides *b* are joined to the folding bottom along the edges *f*, and at those edges the seams are made water tight by turning in the edges of the canvas and cementing or otherwise closing the joints. To keep the pockets in shape and cause them to contract and expand as they travel between and pass around the carrying wheels, a series of skeleton frames 2 attached together by hinge joints 3 at the top and others 4 at the bottom are employed; the same being fixed to the underside of the bottom by turning the edges of the canvas over the sides of the frame and fastening them by placing plates or strips 7—8 one on top and the other beneath the frame and drawing them tightly to place by bolts and nuts 9. Fastenings of this character are preferred to rivets for the reason that they allow the canvas of the sides or the bottom to be replaced when worn at any part. The canvas sides are turned over the edges *f* and clamped between the frame and the strips 8, so as to make the joints or seams impervious to water.

The frames 2 being of metal give the sides of the pockets sufficient stiffness or rigidity to maintain their angular form, and give them the desired collapsing or closing quality to pass over the wheels, and keep them distended or in open position also while traveling in a straight path between the end carriers. The sides *b* of this sluice being flexible are adapted also to crimp or fold between the pockets to such a degree that they will not prevent the collapsing or folding of the pockets necessary to cause them to pass around the rim of the carrying wheels.

In the preferred construction of the skeleton frame the sections 2 are jointed together by a knuckle plate 5 at the top, and another 6 at the bottom, instead of being directly joined together. The effect of placing these knuckle-plates 5—6 between the frames is to reduce or lessen the crimping or folding of the sides *b* between the pockets and also on the line of the ridges between the pockets, so that the sluice will accommodate itself the better to the change from a straight to a curved path or line of travel, and thus pass more easily and evenly around the carrying wheels at the end. It is not intended, however, in this description to confine or limit the construction of the pockets and their frames to this particular construction in which the acute angles at the tops and the bottoms of the pockets are removed by placing the knuckle plates between the frames, because it is practicable to dispense with the knuckle-plates and connect the frames directly together by hinge-joints at the top end and at the bottom.

In the construction first described the knuckle-plates are attached to the frame on one side by the knuckles 3 and 10 formed on the edges of the frames, which when set in line with the knuckles 11 on the knuckle plate are connected by a hinge-pin inserted through both sets of knuckles, whereas in the other construction wherein the knuckle plates are not employed and the frames are joined directly together at the top where they form the angular standing ridge and at the bottom where they meet at an acute angle, the frames are provided with knuckles oppositely arranged to take the hinge-pin. The first described construction, which is illustrated in Fig. 4 has the advantage of producing a pocket with a flat bottom instead of an acute angle at the bottom. In handling or working on some kinds of material the flat bottom will be self-cleaning to a greater degree than the acute angular bottom.

A novel feature in the endless movable sluice of my invention consists in suspending it between two endless belts stretched side by side over two sets of carrying wheels or pulleys around which the belts travel and return in a regular and continuous manner, supporting and moving the sluice regularly between and over the carrying wheels. Belts of canvas or other flexible material such as are commonly employed in machinery for transmitting power from a pulley on one shaft to one on another shaft may be used for that purpose with a relatively short sluice, or where the carrying capacity of the sluice is small, or the load of solid matter ordinarily handled by the pockets is light. Canvas belts under those conditions ordinarily will work without slip or lost motion under the working load. But where a more positive and regular traveling movement and progression of the sluice is desired, and especially where the sluice is loaded heavily, or from other conditions it requires to be driven more positively, or without danger of slipping on the carriers, I employ chain-belts and sprocket-wheels in place of solid belts and broad rimmed pulleys.

In the construction illustrated by Figs. 1, 2 and 3, the sluice is suspended between two endless chain belts composed of links *m* running parallel to each other over two sets of sprocket-wheels *g*, one at each end of the machine, placed at proper distance apart for the sluice to hang free and travel evenly between them. The sluice is suspended from the chain belts by hangers 12—13 each attached at the top to a clip on the stud 17 on the inner side of one of the links of the chain belt, and at the lower end attached to the top of the pocket by means of a strap 19 provided with an eye to take the hooked end of the hanger. The hanger attached to each pocket is crossed over the hanger of the next pocket as seen in Figs. 2, 3 and 4, with the effect to keep the pockets uniformly in position, particularly in passing around the sprocket-wheels; and they serve also to produce even and regular opening movement of the pockets in those periods of their travel when they pass over and return around the end wheels. The chain belts are prevented from being drawn out of alinement and are caused to travel at a uniform distance apart by placing cross bars *p* at intervals apart between the chains. These cross bars *p* are formed each of a rectangularly bent bar with end members 18 of proper dimensions to extend down the sides of the sluice and under the bottom—the side bars 18 being of sufficient length to bring the horizontal bottom bar *p* clear of the frame. This construction also is useful when the sluice is operated with a vibratory or shaking motion to give it the character of a concentrator, in which case the chain-belts are caused to travel with an intermittent jerky movement, transmitting to the suspended sluice a short vibratory motion or shake, the character and extent of which will serve to keep the lighter portion of the sediment or solid matter of different specific gravities in the stream to a greater or less degree in a state of suspension. By virtue of such agitation of the water traveling through the sluice, in conjunction with the progressive movement of the pockets against the current, the lighter portions of the solid particles being kept in suspension near the surface and above the level of the angular ridges will be carried off in the surface water instead of settling into the pockets and so being caught and retained with the heavier and valuable particles. Separation and concentration of the heavy mineral particles from the lighter non-mineral matter is accelerated by operating the sluice in this manner. In separating and recovering from a flowing stream or body of water some kinds of material wherein the conditions do not seem to require such agitating or shaking motion, but on the contrary the separation of the solid matter and the water is found to take place to better advantage without keeping the stream in a state of more or less agitation that motion is omitted and the sluice is propelled or moved forward or against the current with a continuous traveling movement.

Power is applied to the wheels at one end of the sluice by means of a belt pulley *w* on the shaft *t* and a belt *s* connecting it with a power driven shaft or by connecting the shaft *t* with an engine or an electric motor.

In situations of use where such power is not available, and especially where the stream to be operated on is of sufficient head or quantity to propel the sluice, I have provided a simple and effective means for utilizing the stream itself to operate the sluice. In this apparatus which I have illustrated in Fig. 1 the over-shot bucket wheel 20 is set in bearings 21 under the end of a stationary sluice 22 over the head of the separating sluice of my invention, and a distributing trough 23 with standing sides is interposed between the wheel 20 and the top of the endless sluice, so that the stream of water flowing over the bucket-wheel will be caught in the trough and distributed onto the endless sluice as it is discharged from the buckets of the water-wheel. The trough 23 which I prefer to supply for this purpose is composed of a number of separate hopper shaped compartments 29, one of which is seen in top-view in Fig. 6, forming the bottom of the trough, with converging sides and a flat bottom 30. In each bottom are outlet apertures 31 inclining toward the center for the purpose of directing the stream of material at an angle, instead of directly downward against the splash-plate 32 beneath. A stream of water is directed into each compartment through an upright pipe 33 arranged in each compartment for the purpose of facilitating the discharge of the solid matter through the outlets 31. The lower end of this pipe 33 is set in close relation to the bottom of the compartment, so that impinging against it the stream will react on the body of water and the suspended matter above, with the effect to raise the scum and lighter particles to the surface and accelerate the discharge of the same through the surface overflow. The part 32 termed the splash-plate is interposed between the bottom of the trough and the sluice. Its top surface slopes from the center toward the sides of the sluice at a slight angle, and it is set with a gradual pitch toward the tail of the sluice. The sides of the splash-plate should be placed somewhat below the rim or standing sides *b* of the sluice in order to direct the material within the standing sides.

An overflow outlet 34 at the lower end of the trough is regulated by an adjustable gate 35 provided for that purpose, by means of which the level of the discharge may be raised or lowered at will and a greater or less portion of the surface material can be run off with the overflow as the character or condition of the material or the work may require. This part of the apparatus is serviceable also for grading the material carried in suspension by the moving stream, as the lighter portions may be discharged at the surface outlet and only the heavier distributed through the outlets in the bottom.

To the shaft 24 of the water-wheel is connected the sprocket-wheel shaft *t* at the head of the sluice by a series of pulleys and belts, and the power from the bucket-wheel is thus transmitted to the endless sluice, the size of the pulleys being regulated to reduce the speed to the required conditions. As these conditions will necessarily vary with and are obviously controlled by the character of the stream to be handled and operated on and by its volume and rate of flow as well, the travel or rate of movement of the endless sluice must be varied and determined from the existing conditions; it being evident from the manner in which the sluice has been designed to operate that its travel against the current should be at such a rate of speed that the heavy particles will be caught in the pockets and carried toward the head of the machine beneath the stream of light particles still in suspension in the stream flowing over the riffles or ridges.

Provision is made in this apparatus for changing the grade or pitch of the endless sluice by mounting the belt-carrying wheels at the tail end in vertically adjustable bearings in which the shaft boxes 25 which are carried by screws 26 are raised and lowered by the screws and the inclination of the sluice is varied according to the grade required.

The intermediate carrying wheels 27 placed at intervals along the side to carry the belts *m* serve to prevent sagging and keep the sluice on a straight line under the weight of the load.

In operating the endless traveling sluice of my invention the stream of water and matter in suspension is taken on near the head, and flowing through the sluice and over the pockets is discharged at the opposite end, while the sluice continually moving in the opposite direction carries the pockets in endless succession against the current and finally brings them over the wheels at the head and back again in an inverted position to the lower end.

In separating solid matter that is found to stick or adhere to the bottom of the pockets a pipe 36 is placed at the discharge end of the apparatus in position to divert a jet of water against the sides and bottom of the pockets.

While I have termed this invention an apparatus for separating mineral bearing matter from streams of water, I desire it to be understood that I do not limit myself to such use, as the apparatus can be used with equal efficiency for separating any material held in suspension in a fluid. The apparatus may also be termed as classifier or a hydraulic screen as it acts to classify the material into its solid and fluid components, or acts to screen the matter held in suspension. In mining work, the slimes from the ore mill carry in suspension a certain percentage of coarse sand which must be separated from the slimes before further treatment. Where the greatest percentage of value is in the sands, they are further treated and the slimes allowed to waste, and when from the character of the ore the greater percentage of value is in the slimes, they are subjected to further treatment after the coarser heavier material held in suspension has been removed.

I claim:

1. An apparatus for separating mineral bearing matter from streams of water, comprising an endless sluice composed of pliable material, having standing sides and a bottom formed of alternately arranged oppositely inclined frames hinged together and covered with an impervious material, the said sluice being suspended between endless carrying belts to which progressive movement is imparted by means of carrying pulleys.

2. In an apparatus for separating mineral bearing matter from streams of water, an endless sluice composed of flexible sides and a bottom comprising a succession of folding pockets separated by transverse ridges, carrying pulleys, endless belts arranged on the carrying pulleys and to which the sluice is attached and means for holding the pockets within the sluice at that part which lies below the level of the pulleys on the return of the sluice.

3. In an apparatus of the character described, an endless sluice having flexible sides and a folding bottom composed of flexible material and a stiffening frame of plates attached together by hinge-joints at alternately opposite angles, so as to produce a succession of alternate angular depressions and ridges, the said sluice being suspended between two parallel traveling carrying belts on pulleys by which a continuous movement of the sluice in an endless round is maintained, and means combined with the said carrying pulleys for raising and lowering the same to regulate the grade of the endless sluice.

4. In an apparatus of the character described, the endless traveling sluice having flexible standing sides and a flexible bottom composed of flexible material and inclined plates loosely hinged together alternately at top and bottom, the endless carrying belts and means for suspending the sluice from the belts comprising rods attached to the sluice directly beneath the point where the plates are hinged together at the top and links connected loosely to the belts and to the rods.

5. In an apparatus of the character described, an endless sluice having standing flexible sides, and a flexible bottom composed of alternate pockets and ridges and stiffening members attached to the sides of the sluice in line with the ridges.

6. In an apparatus of the character described, an endless traveling sluice composed of flexible standing sides and a bottom composed of alternate pockets and ridges, carrying belts for the sluice, hangers arranged on the sluice in line with the ridges and projecting therefrom, and links attached to the hangers and to the belts for supporting the sluice, said links being attached to the belts in line with one ridge and attached to the hanger at the next adjacent ridge.

7. In an apparatus of the character described, an endless traveling sluice composed of flexible standing sides and a bottom composed of alternate pockets and ridges, carrying belts for the sluice, and braces adapted to hold the belts apart, attached to the belts in line with the ridges and passing beneath the sluice.

JAMES V. COLEMAN.

Witnesses:
H. G. Prost,
M. L. Regner.

Copies of this patent may be obtained for five cents each, by addressing the "Commissioner of Patents, Washington, D. C."